US012652363B2

(12) United States Patent
Liu et al.

(10) Patent No.: US 12,652,363 B2
(45) Date of Patent: Jun. 9, 2026

(54) SHOOTING METHOD AND ELECTRONIC DEVICE

(71) Applicant: VIVO MOBILE COMMUNICATION CO., LTD., Dongguan (CN)

(72) Inventors: Lianggui Liu, Zhejiang (CN); Qiaoshuang Zhang, Zhejiang (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 72 days.

(21) Appl. No.: 18/590,500

(22) Filed: Feb. 28, 2024

(65) Prior Publication Data

US 2024/0205361 A1     Jun. 20, 2024

Related U.S. Application Data

(63) Continuation of application No. PCT/CN2022/115407, filed on Aug. 29, 2022.

(30) Foreign Application Priority Data

Aug. 31, 2021     (CN) .......................... 202111012081.3

(51) Int. Cl.
| | |
|---|---|
| *H04N 5/268* | (2006.01) |
| *H04N 5/262* | (2006.01) |
| *H04N 5/265* | (2006.01) |
| *H04N 23/63* | (2023.01) |
| *H04N 23/698* | (2023.01) |

(52) U.S. Cl.
CPC ........... *H04N 5/268* (2013.01); *H04N 5/2628* (2013.01); *H04N 5/265* (2013.01); *H04N 23/632* (2023.01); *H04N 23/698* (2023.01)

(58) Field of Classification Search
CPC ...... H04N 5/268; H04N 5/2628; H04N 5/265; H04N 23/632; H04N 23/698; H04N 23/45; H04N 23/53; H04N 23/633; H04N 23/69; G06F 1/1624; G06F 1/1652; G06F 1/1677; H04M 1/0268
See application file for complete search history.

(56) References Cited

U.S. PATENT DOCUMENTS

| | | |
|---|---|---|
| 11,410,583 B2 | 8/2022 | Kim et al. |
| 2016/0217551 A1 | 7/2016 | Kim et al. |
| 2021/0103314 A1 | 4/2021 | Ko et al. |

FOREIGN PATENT DOCUMENTS

| | | |
|---|---|---|
| CN | 206894705 U | 1/2018 |
| CN | 108322647 A | 7/2018 |
| CN | 108540641 A | 9/2018 |
| CN | 109361794 A | 2/2019 |
| CN | 110545354 A | 12/2019 |
| CN | 111107269 A | 5/2020 |
| CN | 111131706 A | 5/2020 |
| CN | 111182213 A | 5/2020 |
| CN | 111225154 A | 6/2020 |
| CN | 111246101 A | 6/2020 |

(Continued)

*Primary Examiner* — Yogesh K Aggarwal

(74) *Attorney, Agent, or Firm* — The Webb Law Firm

(57) ABSTRACT

A shooting method, applied to a shooting apparatus including a telescopic screen, includes obtaining telescopic information of the telescopic screen; determining, based on the telescopic information, a target camera used for shooting; and displaying a target preview image captured by the target camera.

20 Claims, 7 Drawing Sheets

(56)            References Cited

FOREIGN PATENT DOCUMENTS

| CN | 111988527 | A | 11/2020 |
|---|---|---|---|
| CN | 112689990 | A | 4/2021 |
| CN | 113114819 | A | 7/2021 |
| CN | 113727001 | A | 11/2021 |
| DE | 202021102687 | U1 | 8/2021 |
| JP | H0759070 | A | 3/1995 |
| JP | 2001036781 | A | 2/2001 |
| JP | 2003295291 | A | * 10/2003 |

* cited by examiner

1300

Electronic device

1310

Processor

1309

Memory

1400

1401 — Radio frequency unit

Network module — 1402

1410

Memory

1409 — Application program

Operating system

Audio output unit — 1403

1404

Input unit

Graphics processing unit — 14041

Microphone — 14042

1408 — Interface unit

Processor

1407

User input unit

14071 — Touch panel

14072 — Other input devices

1406

Display unit

Display panel — 14061

Sensor — 1405

SHOOTING METHOD AND ELECTRONIC DEVICE

CROSS-REFERENCE TO RELATED APPLICATIONS

This application is a Bypass Continuation Application of International Patent Application No. PCT/CN2022/115407, filed Aug. 29, 2022, and claims priority to Chinese Patent Application No. 202111012081.3, filed Aug. 31, 2021, the disclosures of which are hereby incorporated by reference in their entireties.

BACKGROUND OF THE INVENTION

Field of the Invention

This application pertains to the field of shooting technologies, and particularly relates to a shooting method, a shooting apparatus, and an electronic device.

Description of Related Art

When a user shoots a picture or video by using a mobile phone, a tablet, or another smart device, a preview image is usually displayed on a screen. At present, a shooting angle of every electronic device relies on manual control and adjustment by a user. When the user manually adjusts the shooting angle, a shooting rate of the electronic device in shooting pictures or videos is low due to hand tremor and other reasons.

SUMMARY OF THE INVENTION

According to a first aspect, an embodiment of this application provides a shooting method. The shooting method is applied to a shooting apparatus including a telescopic screen. The shooting method includes: obtaining telescopic information of the telescopic screen; determining, based on the telescopic information, a target camera used for shooting; and displaying a target preview image captured by the target camera.

According to a second aspect, an embodiment of this application provides a shooting apparatus including a telescopic screen. The shooting apparatus includes: an obtaining unit, configured to obtain telescopic information of the telescopic screen; a determining unit, configured to determine, based on the telescopic information, a target camera used for shooting; and a display unit, configured to display a target preview image captured by the target camera.

According to a third aspect, an embodiment of this application provides an electronic device. The electronic device includes a processor, a memory, and a program or instructions stored in the memory and executable on the processor. When the program or instructions are executed by the processor, the steps of the shooting method according to the first aspect are implemented.

According to a fourth aspect, an embodiment of this application provides a non-transitory readable storage medium. The non-transitory readable storage medium stores a program or instructions. When the program or instructions are executed by a processor, the steps of the shooting method according to the first aspect are implemented.

According to a fifth aspect, an embodiment of this application provides a chip. The chip includes a processor and a communications interface. The communications interface is coupled to the processor. The processor is configured to run a program or instructions to implement the steps of the shooting method according to the first aspect.

DESCRIPTION OF THE INVENTION

The following clearly describes the technical solutions in the embodiments of this application with reference to the accompanying drawings in the embodiments of this application. Apparently, the described embodiments are only some rather than all of the embodiments of this application. All other embodiments obtained by a person of ordinary skill in the art based on the embodiments of this application shall fall within the protection scope of this application.

The terms "first", "second", and the like in this specification and claims of this application are used to distinguish between similar objects instead of describing a specific order or sequence. It should be understood that the terms used in this way are interchangeable in appropriate circumstances, so that the embodiments of this application can be implemented in other orders than the order illustrated or described herein. In addition, objects distinguished by "first" and "second" usually fall within one class, and a quantity of objects is not limited. For example, there may be one or more first objects. In addition, the term "and/or" in the specification and claims indicates at least one of connected objects, and the character "/" generally represents an "or" relationship between associated objects.

A shooting method and apparatus, and an electronic device provided in the embodiments of this application are hereinafter described in detail by using embodiments and application scenarios thereof with reference to FIG. 1 to FIG. 14.

Figures 1, 2:
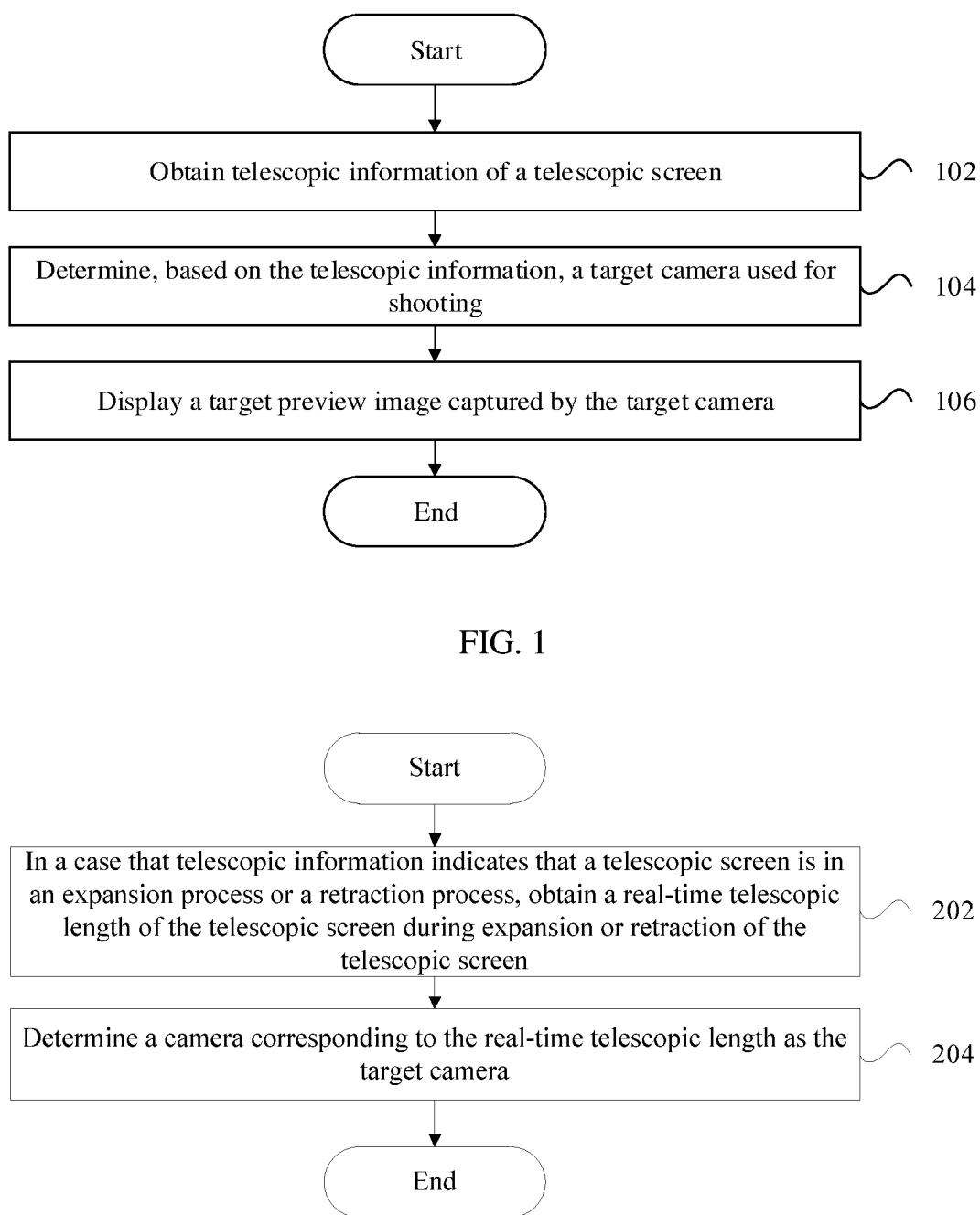
FIG. 1 is a first schematic flowchart of a shooting method according to an embodiment of this application.
FIG. 2 is a second schematic flowchart of a shooting method according to an embodiment of this application.

An embodiment provides a shooting method. FIG. 1 is a first schematic flowchart of a shooting method according to an embodiment of this application. As shown in FIG. 1, the shooting method includes the following steps.

Step 102: Obtain telescopic information of a telescopic screen.

The telescopic information includes at least one of a telescopic speed or a telescopic length.

Step 104: Determine, based on the telescopic information, a target camera used for shooting.

Step 106: Display a target preview image captured by the target camera.

The shooting method provided in this embodiment is mainly applied to an electronic device with a telescopic screen, so that when the telescopic screen moves, a preview image being shot changes accordingly, to improve preview experience of a user. In a process of shooting by using a shooting apparatus, telescopic information of the telescopic screen is obtained, and the telescopic information includes at least one of the following: a telescopic speed or a telescopic length. A target camera that needs to be invoked in the shooting process is determined by analyzing the telescopic information of the telescopic screen, the target camera is invoked to capture an image, a target preview image is generated based on the image captured by the target camera, and the target preview image is displayed by using the telescopic screen.

For example, in the shooting process, the user can control a telescopic state of the telescopic screen. In the shooting process, after the shooting apparatus receives an instruction for controlling the telescopic state of the telescopic screen, the shooting apparatus controls the telescopic screen to start performing a corresponding telescopic action and obtains the telescopic information of the telescopic screen. The telescopic information includes at least one of the telescopic length or telescopic speed. Based on at least one of the telescopic length or telescopic speed of the telescopic screen, a target camera is selected from a plurality of cameras of the shooting apparatus, and an image is captured by using the target camera. One target camera may be selected, or a plurality of target cameras may be selected. The telescopic screen is controlled to display a target preview image captured by the target camera. The target preview image may be an image obtained through shooting by a single target camera, or the target preview image may be an image obtained by processing images shot by a plurality of target cameras.

In some embodiments, when the user shoots a panoramic image by using the shooting apparatus including the telescopic screen, the user does not need to manually move the shooting apparatus. Instead, the user controls expansion or retraction of the telescopic screen, thereby driving the cameras to perform mechanical movement and increasing a panoramic image shooting rate. The target preview image corresponding to the panoramic image is displayed on the telescopic screen. Therefore, it can be ensured that the panoramic image fits the telescopic screen better, and a viewing angle in the panoramic image on the telescopic screen is widened without losing an object size in the panoramic image.

In this embodiment of this application, the shooting apparatus controls expansion or retraction of the telescopic screen in the shooting process to select a target camera from a plurality of cameras, and displays a target preview image based on an image captured by the target camera. Therefore, based on different telescopic information of the telescopic screen, different target cameras can be selected to capture target preview images, and the telescopic screen is controlled to drive the cameras to perform mechanical movement when shooting panoramic images, to ensure a higher panoramic shooting rate. Further, images captured by the plurality of cameras can be composited, and a viewing angle in a preview image can be widened based on a change of the telescopic length of the telescopic screen without losing perception of an object size in the preview image. Therefore, a shooting effect is optimized, and shooting experience is improved.

It may be understood that the change of the telescopic length of the telescopic screen in the shooting process ensures that the obtained target preview image fits a display area of the telescopic screen better. Therefore, the target preview image can be losslessly displayed on the telescopic screen, and an image actually obtained through shooting is consistent with the target preview image.

The telescopic information of the telescopic screen includes the telescopic length. The greater the telescopic length of the telescopic screen, the larger the screen display area of the telescopic screen. The smaller the telescopic length of the telescopic screen, the smaller the screen display area of the telescopic screen. Depending on different display area sizes of the telescopic screen, different cameras located in the shooting apparatus are selected for shooting. Different cameras include cameras in different positions and cameras with different functions, so that a target preview image obtained through shooting fits a size of the display area of the display screen.

It should be noted that the telescopic information of the telescopic screen includes the telescopic speed. When the telescopic speed of the telescopic screen is zero, the telescopic screen is in a stationary state. When the telescopic screen is in the stationary state, a target image is captured by the target camera and displayed. When the telescopic speed of the telescopic screen is greater than zero, that is, when the telescopic screen is in the telescopic state, shooting parameters of the invoked camera may change. To ensure an imaging effect, when a telescopic speed is high, a camera with a higher motion capture capability may be selected for shooting.

In some embodiments of this application, FIG. 2 is a second schematic flowchart of a shooting method according to an embodiment of this application. As shown in FIG. 2, a step of determining, based on telescopic information, a target camera used for shooting includes the following steps.

Step 202: In a case that the telescopic information indicates that a telescopic screen is in an expansion process or a retraction process, obtain a real-time telescopic length of the telescopic screen during expansion or retraction of the telescopic screen.

The telescopic information includes at least one of a telescopic speed or a telescopic length. For example, after the telescopic information of the telescopic screen is obtained and it is determined that the telescopic speed in the telescopic information is greater than 0, it is determined that the telescopic screen is in a moving state, that is, it is determined that the telescopic screen is in the expansion process or that the telescopic screen is in the retraction process. A moving state of the telescopic screen is determined based on the telescopic length in the telescopic information, and a changing status of the telescopic length of the telescopic screen captured at two consecutive times is determined. When it is determined that the telescopic length is increasing, it is determined that the telescopic screen is in the expansion process. When it is determined that the telescopic length is decreasing, it is determined that the telescopic screen is in the retraction process.

Step 204: Determine a camera corresponding to the real-time telescopic length as the target camera.

In this embodiment of this application, a current status of the telescopic screen can be determined based on the telescopic information. When it is determined that the telescopic screen is in a moving process, that is, when the telescopic screen is in the expansion process or the telescopic screen is in the retraction process, the real-time telescopic length of the telescopic screen is detected. A target camera is determined among a plurality of cameras based on the real-time telescopic length of the telescopic screen.

In some embodiments, an electronic device includes a plurality of cameras, and the plurality of cameras are all disposed on the telescopic screen. When the telescopic screen is in a fully retracted state, there is a camera in an exposed state. The electronic device invokes, in response to a start shooting instruction, the camera in the exposed state to capture a target preview image. A memory of the electronic device stores a correspondence between other cameras and the length of the telescopic screen, and the target camera in the correspondence is found based on the real-time telescopic length of the telescopic screen.

In some other embodiments, the electronic device includes a plurality of cameras, and the plurality of cameras are all disposed on the telescopic screen. When the telescopic screen is in a fully retracted state, there is a camera in an exposed state. A photosensitive element is disposed in each of the plurality of cameras. When the telescopic screen is in the expansion or retraction process, the target camera is selected from the plurality of cameras based on changes of luminous flux detected by the photosensitive elements in the cameras. For example, if it is detected that a change of luminous flux of a camera exceeds a change threshold, the camera is selected as the target camera.

For example, a shooting apparatus with a telescopic screen is usually provided with a plurality of cameras. When the telescopic screen of the shooting apparatus is in a retracted state, some of the plurality of cameras are in a stored state. As the telescopic screen is expanded, the cameras in the stored state move with the telescopic screen, until the cameras are in the exposed state. A quantity of cameras in the exposed state is adjusted by controlling the movement of the telescopic screen, and the target camera is determined based on the real-time telescopic length of the telescopic screen.

A driving component for driving the telescopic screen to move is disposed in the shooting device. The real-time telescopic length may be obtained based on a driving parameter of the driving component.

For example, the telescopic screen is selected as a scroll screen, and the driving component is selected as a driving motor. The real-time telescopic length of the telescopic screen can be obtained based on a rotation speed and running duration of the driving motor.

Figure 3:
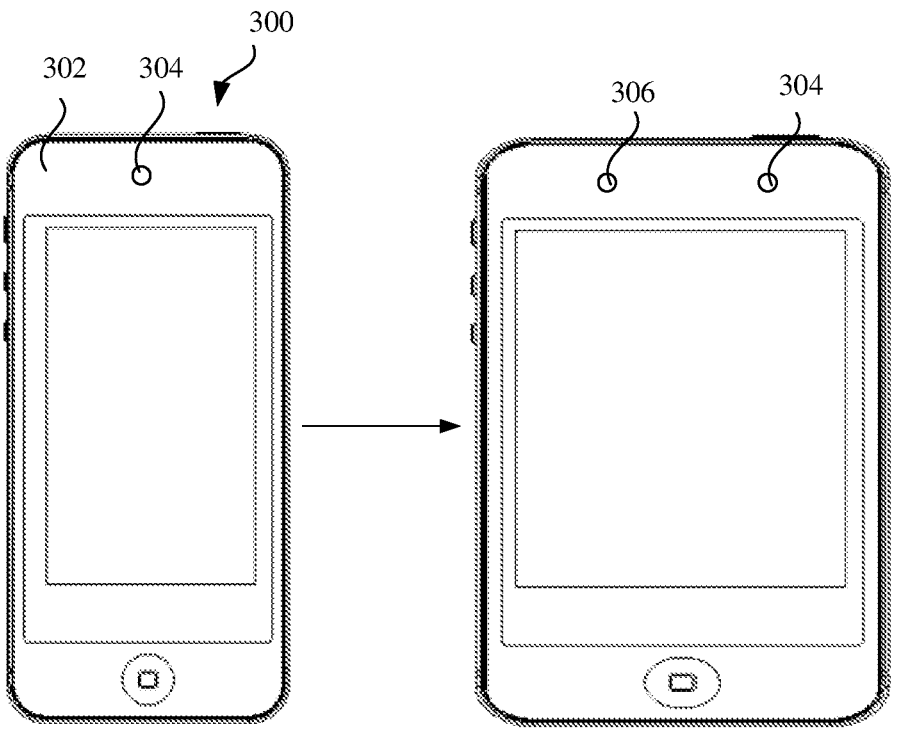
FIG. 3 is a first schematic diagram of a shooting apparatus according to an embodiment of this application.

FIG. 3 is a first schematic diagram of a shooting apparatus according to an embodiment of this application. As shown in FIG. 3, the shooting apparatus is a mobile phone 300, and a telescopic screen is disposed as a scroll screen 302. The mobile phone has a first camera 304 and a second camera 306. The first camera 304 and the second camera 306 are both located on the scroll screen 302. When the scroll screen 302 of the mobile phone 300 is in a retracted state, the first camera 304 is in an exposed state, and the second camera 306 is in a stored state. The first camera 304 serves as a main camera, that is, when the scroll screen 302 is in the retracted state, a user can perform shooting by using the first camera 304. The second camera 306 serves as an auxiliary camera. When the scroll screen 302 is in an expanded state, the second camera 306 is in an exposed state. When the second camera 306 is in the exposed state, the user can perform shooting by using the second camera 306. During expansion or retraction of the scroll screen 302, the second camera 306 moves with the scroll screen 302.

In this embodiment of this application, cameras in different positions can be selected as target cameras based on movement of the telescopic screen. Alternatively, a camera stored with the telescopic screen can be automatically selected as a target camera.

For example, the shooting apparatus has a plurality of cameras with different functions. When the telescopic screen of the shooting apparatus moves to different real-time telescopic lengths, selection can be made among the plurality of cameras with different functions.

Figure 4:
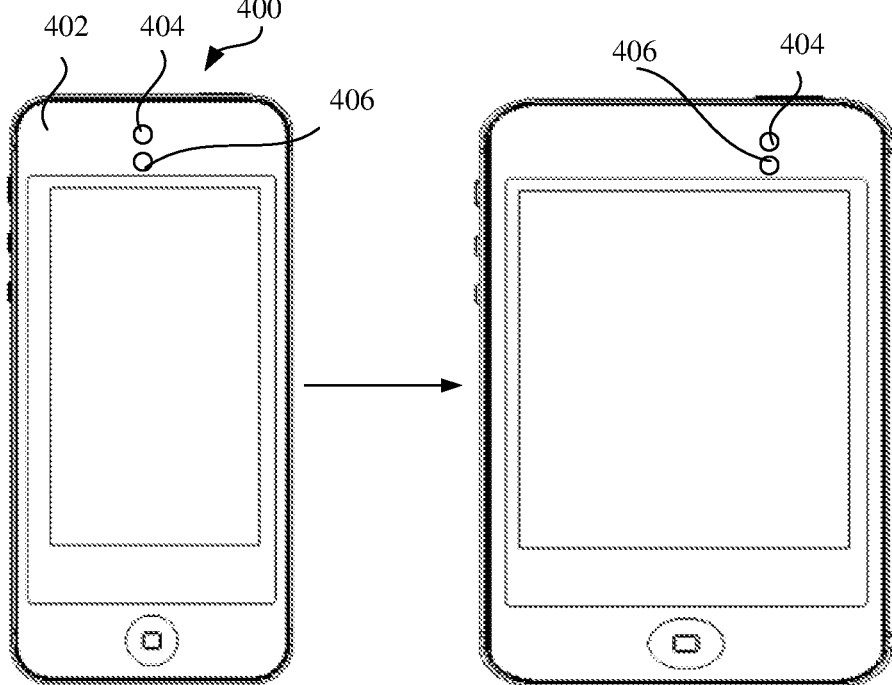
FIG. 4 is a second schematic diagram of a shooting apparatus according to an embodiment of this application.

FIG. 4 is a second schematic diagram of a shooting apparatus according to an embodiment of this application. As shown in FIG. 4, the shooting apparatus is a mobile phone 400, and a telescopic screen is disposed as a scroll screen 402. The mobile phone 400 has a third camera 404 and a fourth camera 406. When the scroll screen 402 is in a fully retracted state, the third camera 404 and the fourth camera 406 are both in an exposed state. A framing range of the third camera 404 is narrower than a framing range of the fourth camera 406. When a real-time telescopic length of the mobile phone 400 does not reach a specified length, the third camera 404 is controlled to serve as a target camera for shooting. When the real-time telescopic length of the mobile phone 400 reaches the specified length, at least one of the third camera 404 or the fourth camera 406 is selected for shooting.

In this embodiment of this application, cameras with different shooting functions can be selected as target cameras based on movement of the telescopic screen, and cameras with corresponding functions can be automatically selected as target cameras based on the real-time telescopic length of the screen, so that a target preview image obtained through shooting can fit a screen size better.

It should be noted that a plurality of target cameras corresponding to the real-time telescopic length may be cameras located at different positions on the shooting apparatus, or may be selected as cameras with different framing ranges. Therefore, flexibility of selection is improved.

Figure 5:
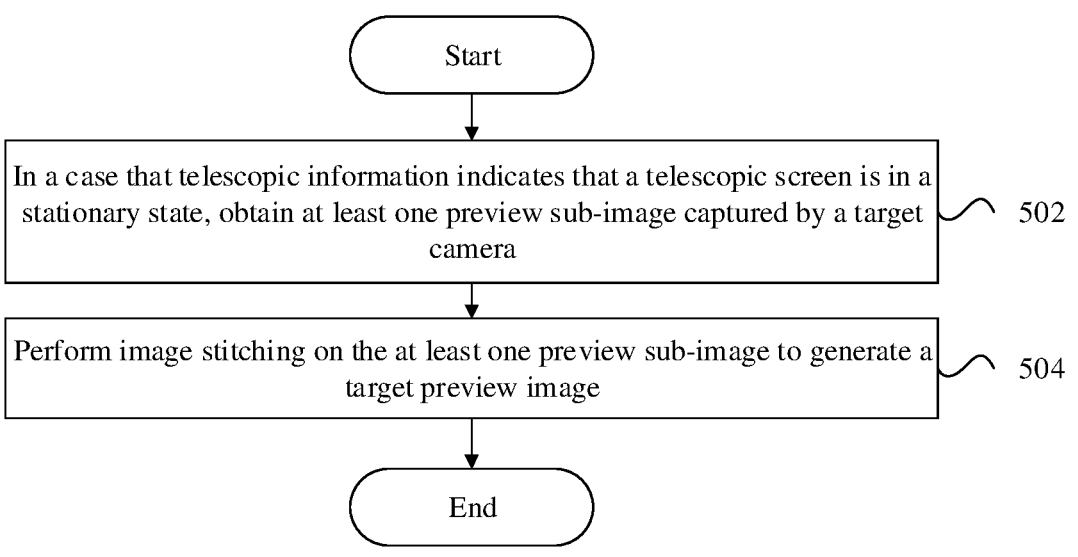
FIG. 5 is a third schematic flowchart of a shooting method according to an embodiment of this application.

In some embodiments of this application, FIG. 5 is a third schematic flowchart of a shooting method according to an embodiment of this application. As shown in FIG. 5, before displaying a preview image captured by a target camera, the method further includes the following steps.

Step 502: In a case that telescopic information indicates that a telescopic screen is in a stationary state, obtain at least one preview sub-image captured by the target camera.

Step 504: Perform image stitching on the at least one preview sub-image to generate a target preview image.

In this embodiment of this application, in a shooting process, after determining the target camera and before displaying the preview image captured by the target camera, a shooting apparatus performs analysis processing on the obtained telescopic information, determines, based on the telescopic information, that the telescopic screen is in the stationary state, and obtains the preview sub-image captured by the target camera, where there may be one or more preview sub-images, and there may be one or more target cameras. It may be understood that when there are a plurality of preview sub-images, the plurality of preview sub-images are images captured by a plurality of target cameras respectively, or the plurality of preview sub-images are a plurality of images captured by one target camera. After obtaining the preview sub-images, the shooting apparatus stitches the preview sub-images to generate the target preview image, so that the shooting apparatus can subsequently display the target preview image.

When the telescopic screen is in the stationary state and there are a plurality of target cameras, a plurality of preview sub-images are captured by using the plurality of target cameras. Because at least one of locations or framing ranges of the plurality of target cameras is different, objects in the plurality of preview sub-images captured by the plurality of target cameras are also different. Therefore, the target preview image obtained by stitching the plurality of preview sub-images can cover more objects. This improves an imaging effect of the target preview image and improves user experience.

Figure 6:
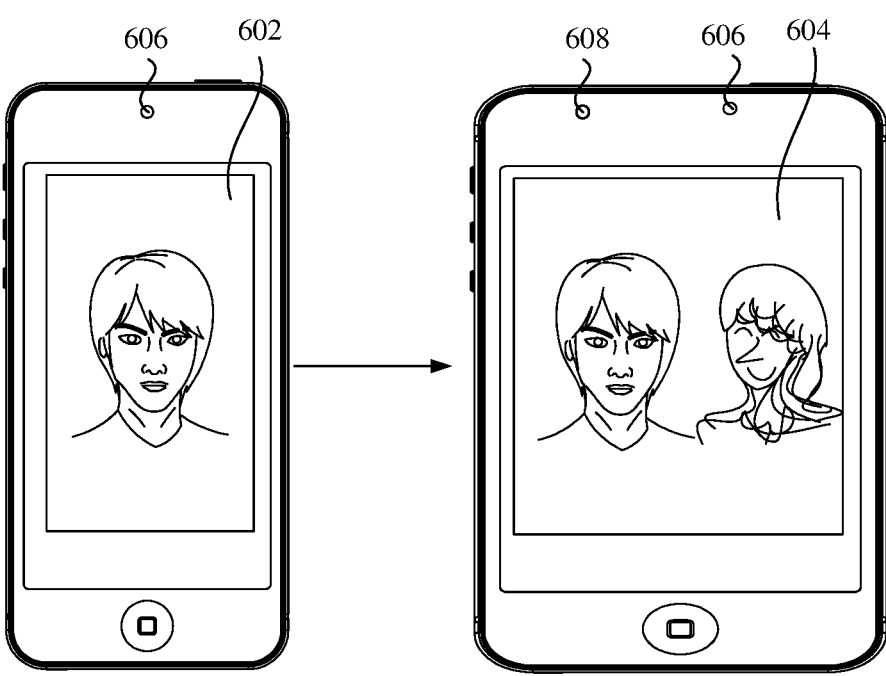
FIG. 6 is a first schematic diagram of an image shot by a shooting apparatus according to an embodiment of this application.

FIG. 6 is a first schematic diagram of an image shot by a shooting apparatus according to an embodiment of this application. As shown in FIG. 6, target cameras include two cameras: a fifth camera 606 and a sixth camera 608. A first preview sub-image 602 can be obtained by the fifth camera 606 through shooting, and a second preview sub-image can be obtained by the sixth camera 608 through shooting. A target preview image 604 including all photographed objects in the first preview sub-image and the second preview sub-image can be generated by stitching the first preview sub-image 602 and the second preview sub-image.

It may be understood that in the process of stitching the preview sub-images, a same photographed object in the plurality of preview sub-images is found, and image processing can be performed on the same photographed object in a stitching manner to improve definition thereof. This not only increases a quantity of photographed objects in the target preview image, but also improves an imaging effect of the target preview image.

Figure 7:
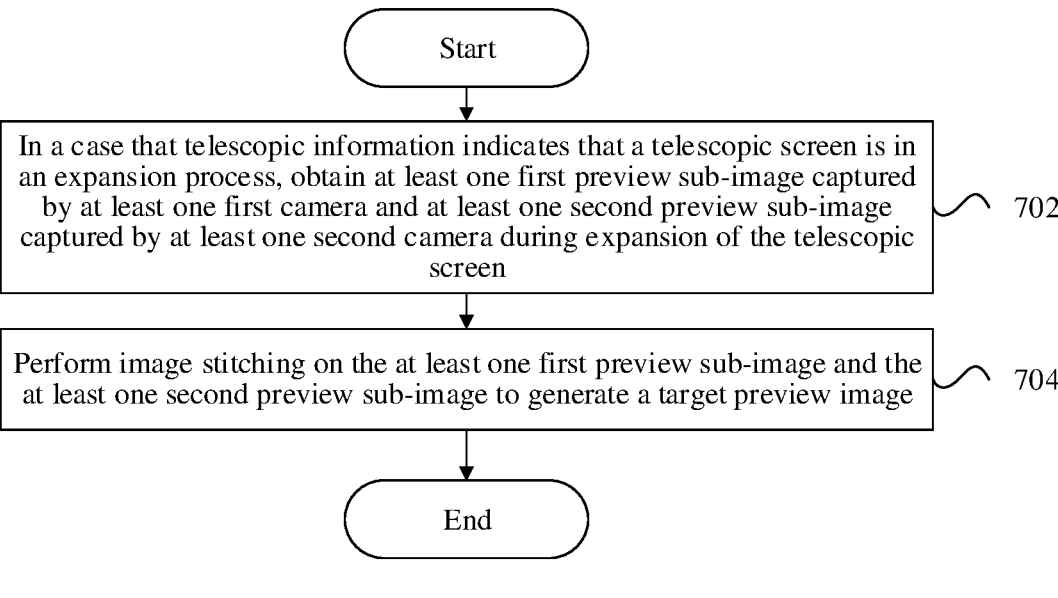
FIG. 7 is a fourth schematic flowchart of a shooting method according to an embodiment of this application.

In some embodiments of this application, target cameras include at least one first camera in a stationary state and at least one second camera in a moving state. FIG. 7 is a fourth schematic flowchart of a shooting method according to an embodiment of this application. As shown in FIG. 7, before displaying a preview image captured by a target camera, the method further includes the following steps.

Step 702: In a case that telescopic information indicates that a telescopic screen is in an expansion process, obtain at least one first preview sub-image captured by at least one first camera and at least one second preview sub-image captured by at least one second camera during expansion of the telescopic screen.

Step 704: Perform image stitching on the at least one first preview sub-image and the at least one second preview sub-image to generate a target preview image.

In this embodiment of this application, a shooting apparatus includes a plurality of cameras, and the plurality of cameras include a first camera and a second camera. The first camera is in a stationary state, and the second camera is in a moving state. It may be understood that the first camera and the second camera are both disposed on a telescopic screen. During expansion of the telescopic screen, the screen is expanded in one direction. The first camera does not move as the screen is expanded, but the second camera moves as the screen is expanded. If it is determined, based on telescopic information, that the telescopic screen is in the expansion process, the first camera in the stationary state shoots an image, and the second camera shoots an image during movement. Because the second camera is in the moving state in the shooting process, a target preview image is obtained by stitching a first preview sub-image captured by the first camera and a second preview sub-image captured by the second camera. The target preview image is a panoramic image.

It may be understood that there may be one or more first cameras in the stationary state. When there are a plurality of first cameras, at least one of locations or framing ranges of the plurality of first cameras is different. There may be one or more second cameras in the moving state. When there are a plurality of second cameras, at least one of locations or framing ranges of the plurality of second cameras is different.

For example, when a user needs to perform shooting by using the shooting apparatus, the user controls the telescopic screen of the shooting apparatus to start expansion. The first camera in the shooting apparatus does not move with expansion of the telescopic screen. During expansion of the telescopic screen, the first camera in the stationary state captures the first preview sub-image, the second camera in the shooting apparatus moves as the telescopic screen is expanded, and the second camera continues to capture the second preview sub-image during the movement. The shooting apparatus stitches the second preview sub-image and the first preview sub-image to obtain the panoramic image, and displays the panoramic image as the target preview image. The telescopic screen is driven by a driving component in the entire expansion process. Therefore, stability of the second camera moving with the telescopic screen is ensured.

In this embodiment of this application, in the process of shooting the panoramic image, the second camera moving with the telescopic screen is controlled to capture the second preview sub-image, and expansion of the telescopic screen is an alternative to manually moving the shooting apparatus by the user. Because the telescopic screen is driven by the driving component in the entire expansion process, uniform and stable movement of the second camera can be maintained in the process of capturing the second preview sub-image. This avoids a problem that a poor imaging effect is caused by a shake when the user performs shooting manually.

Figure 8:
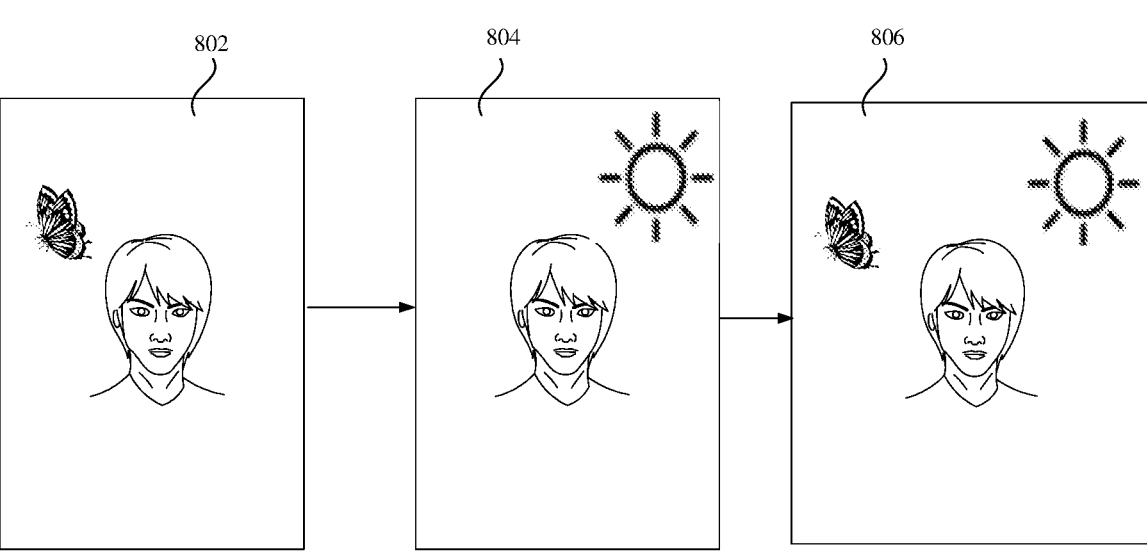
FIG. 8 is a second schematic diagram of an image shot by a shooting apparatus according to an embodiment of this application.

FIG. 8 is a second schematic diagram of an image shot by a shooting apparatus according to an embodiment of this application. As shown in FIG. 8, the shooting apparatus is a mobile phone, and a telescopic screen is a scroll screen. A first camera and a second camera are both disposed on the scroll screen. The second camera is a main camera of the shooting apparatus. To be specific, when the scroll screen is in a fully retracted state, the second camera is also in an exposed state. The first camera is an auxiliary camera. To be specific, when the scroll screen is in the fully retracted state, the first camera is in a stored state, and when the scroll screen is fully expanded, the first camera is in an exposed state. In a shooting process, the scroll screen is controlled to start expansion. During expansion, the second camera moves to the right at a constant speed as the scroll screen is expanded. The second camera continues to capture a second preview sub-image 804 during the movement until the first camera is an exposed state. When the first camera is in the exposed state, the first camera starts to capture a first preview sub-image 802. A location of the first camera in the exposed state is different from an initial location of the second camera, and may be on the left side of the initial location of the second camera. The first preview sub-image 802 and the second preview sub-image 804 are composited to obtain a target preview image 806. The target preview image 806 is a panoramic image. In the shooting process, a real-time telescopic length of the scroll screen in an expanded state gradually increases, that is, a display area of the scroll screen gradually becomes larger. Therefore, it can be ensured that a size of the panoramic target preview image 806 fits the display area of the scroll screen.

It should be noted that a moving speed of the second camera can affect the captured second preview sub-image, and therefore affect the finally generated target preview image.

In some embodiments, before starting shooting, the shooting apparatus can collect brightness of a shooting environment by using an optical sensor, thereby controlling an expansion speed of the scroll screen in the shooting process to ensure that the moving speed of the second camera meets an exposure requirement of the second preview sub-image. For example, in a relatively dark environment, AE exposure is relatively long. If the second camera moves too fast, problems such as a smear may be caused in the second preview sub-image. In this case, the expansion speed of the scroll screen is automatically reduced, so that image quality of the second preview sub-image is higher and that image quality of the fused target preview image is improved.

In some other embodiments, a user can control a telescopic speed of the scroll screen in the shooting process. For example, in the shooting process, by pressing a volume button, the user controls the scroll screen to start to expansion or retraction. When a volume "+" button is pressed, the scroll screen is controlled to expand at a first speed; when the volume "+" button is long-pressed, the scroll screen is controlled to expand at a second speed; when a volume "−" button is pressed, the scroll screen is controlled to retract at the first speed; and when the volume "−" button is long-pressed, the scroll screen is controlled to retract at the second speed, where the first speed is less than the second speed. The user can control the telescopic speed of the scroll screen by changing a triggering mode of the button.

It should be noted that the user can further adjust the telescopic speed of the telescopic screen in a settings interface of the shooting apparatus.

Figure 9:
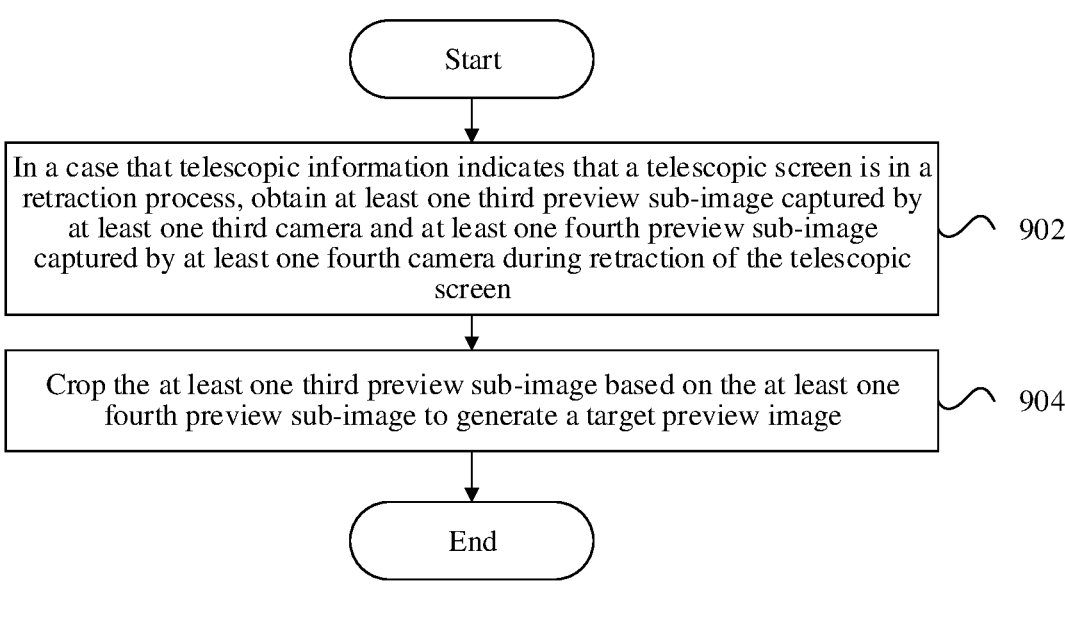
FIG. 9 is a fifth schematic flowchart of a shooting method according to an embodiment of this application.

In some embodiments of this application, target cameras include at least one third camera in a stationary state and at least one fourth camera in a moving state. FIG. 9 is a fifth schematic flowchart of a shooting method according to an embodiment of this application. As shown in FIG. 9, before displaying a preview image captured by a target camera, the method further includes the following steps.

Step 902: In a case that telescopic information indicates that a telescopic screen is in a retraction process, obtain at least one third preview sub-image captured by at least one third camera and at least one fourth preview sub-image captured by at least one fourth camera during retraction of the telescopic screen.

Step 904: Crop the at least one third preview sub-image based on the at least one fourth preview sub-image to generate a target preview image.

In this embodiment of this application, a shooting apparatus includes a plurality of cameras, and the plurality of cameras include a third camera and a fourth camera. The third camera is in a stationary state, and the fourth camera is in a moving state. It may be understood that the third camera and the fourth camera are both disposed on a telescopic screen. During retraction of the telescopic screen, the screen is retracted in one direction. The third camera does not move as the screen is retracted, but the fourth camera moves as the screen is retracted. If it is determined, based on telescopic information, that the telescopic screen is in the retraction process, the third camera in the stationary state shoots an image, and the fourth camera shoots an image during movement. A corresponding target preview image can be generated by cropping a third preview sub-image based on a fourth preview sub-image shot during the movement of the fourth camera.

For example, at the beginning of shooting by the shooting apparatus, the third preview sub-image captured by the third camera in the stationary state is displayed as a target preview image. In the shooting process, the fourth camera in the moving state continues to capture the fourth preview sub-image, and the third preview sub-image is cropped based on the fourth preview sub-image captured in real time. The shooting apparatus displays the target preview image obtained through cropping processing.

For example, the shooting apparatus is a mobile phone, and the telescopic screen is a scroll screen. The third camera and the fourth camera are both disposed on the scroll screen. The third camera is a main camera of the shooting apparatus, and the fourth camera is an auxiliary camera of the shooting apparatus. When the scroll screen is in a fully expanded state, the third camera and the fourth camera are both in an exposed state. In the shooting process, the scroll screen is controlled to start retraction. During retraction, the third camera is in the stationary state, and the third camera continues to capture the third preview sub-image. In this case, the shooting apparatus displays the third preview sub-image as a target preview image. The fourth camera moves to the left at a constant speed as the scroll screen is retracted. The fourth camera continues to capture the fourth preview sub-image during the movement. In addition, the third preview sub-image is cropped based on the captured fourth preview sub-image, and the displayed target preview image is updated to the image obtained through cropping.

In the shooting process in this embodiment of this application, the telescopic screen is controlled to be in a retracted state, and the third preview sub-image captured by the third camera in the stationary state is cropped based on the fourth preview sub-image captured by the fourth camera in the moving state. In the cropping process, a main photographed object in the third preview sub-image is retained, the background of the main photographed object is cropped based on the fourth preview sub-image, and the target preview image shot and displayed by the shooting apparatus is an image including the main photographed object.

In some embodiments of this application, a step of determining, based on the telescopic information, a target camera used for shooting includes: in a case that the telescopic information indicates that the telescopic screen is in the expansion process or the retraction process, selecting one camera from at least two cameras as the target camera.

In this embodiment of this application, the shooting apparatus includes at least two cameras, and the at least two cameras are different cameras. In the shooting process of the shooting apparatus, one of the at least two cameras is selected as the target camera based on a telescopic state of the telescopic screen.

The at least two cameras are completely different cameras. Optionally, the at least two cameras are disposed in different positions. For example, when the telescopic screen is in a fully retracted state, the at least two cameras include a camera in an exposed state and a camera in a stored state. Further optionally, framing ranges of the at least two cameras are different. Further optionally, zoom ratios of the at least two cameras are different.

In this embodiment of this application, based on the telescopic state of the telescopic screen of the shooting apparatus, a corresponding camera is automatically selected from the plurality of cameras for shooting. A user can switch between cameras by controlling the telescopic state of the telescopic screen, thereby reducing operation steps of the user in the shooting process.

In some embodiments of this application, the selecting one camera from at least two cameras as the target camera in a case that the telescopic information indicates that the telescopic screen is in the expansion process or the retraction process includes: in a case that the telescopic information indicates that the telescopic screen is in the expansion process, switching from a first camera in a working state to a second camera; or in a case that the telescopic information indicates that the telescopic screen is in the retraction process, switching from a first camera in a working state to the third camera, where a zoom ratio of the first camera is less than a zoom ratio of the second camera, and the zoom ratio of the first camera is greater than a zoom ratio of the third camera.

In this embodiment of this application, the shooting device includes the first camera, the second camera, and the third camera, where the second camera has a large zoom ratio. If it is determined, based on the telescopic information, that the telescopic screen is in the expansion process, the second camera with a large zoom ratio is turned on, the first camera is turned off, and an image captured by the second camera is used as a target preview image. If it is determined, based on the telescopic information, that the telescopic screen is in the retraction process, the third camera with a small zoom ratio is turned on, the first camera is turned off, and an image captured by the third camera is used as a target preview image.

For example, the shooting device is a mobile phone, and the telescopic screen is a scroll screen. After the user enables a shooting function of the mobile phone, the mobile phone captures an image by using the first camera and displays the image as a target preview image on the scroll screen. In response to an input by the user to control expansion of the scroll screen, the mobile phone controls the scroll screen to start expansion. In this case, the mobile phone determines that the user needs to photograph a far object, that is, there is a need to increase the zoom ratio. The mobile phone controls the first camera to be off and the second camera to be on, and uses an image captured by the second camera with a large zoom ratio as a target preview image. In response to an input by the user to control retraction of the scroll screen, the mobile phone controls the scroll screen to start retraction. In this case, the mobile phone determines that the user needs to photograph a near object, that is, there is a need to reduce the zoom ratio. The mobile phone controls the first camera to be off and the third camera to be on, and uses an image captured by the third camera with a small zoom ratio as a target preview image.

The second camera is a periscope camera, and the third camera is a wide-angle camera. For the periscope camera, a maximum zoom ratio is 60×, and a minimum zoom ratio is 1×. For the wide-angle camera, a maximum zoom ratio is 1×, and a minimum zoom ratio is 0.6×.

In this embodiment of this application, automatic recognition and adjustment can be performed based on an object to be photographed. For example, if it is recognized that the object to be photographed is a person, and photographing of the person does not require a high magnification, the mobile phone automatically switches to the third camera to keep the person in the center of a picture with an appropriate size, and automatically expands the screen to adjust the magnification. A wide angle is required for photographing more objects. When it is recognized that scenery is being photographed, the mobile phone automatically switches to the second camera.

In some embodiments of this application, in the case that the telescopic information indicates that the telescopic screen is in the expansion process or the retraction process, the zoom ratio of the target camera is adjusted.

In this embodiment of this application, after the target camera is determined, an image captured by the target camera is displayed on the telescopic screen as a target preview image, and the user adjusts the zoom ratio of the target camera by controlling the telescopic state of the telescopic screen.

Figure 10:
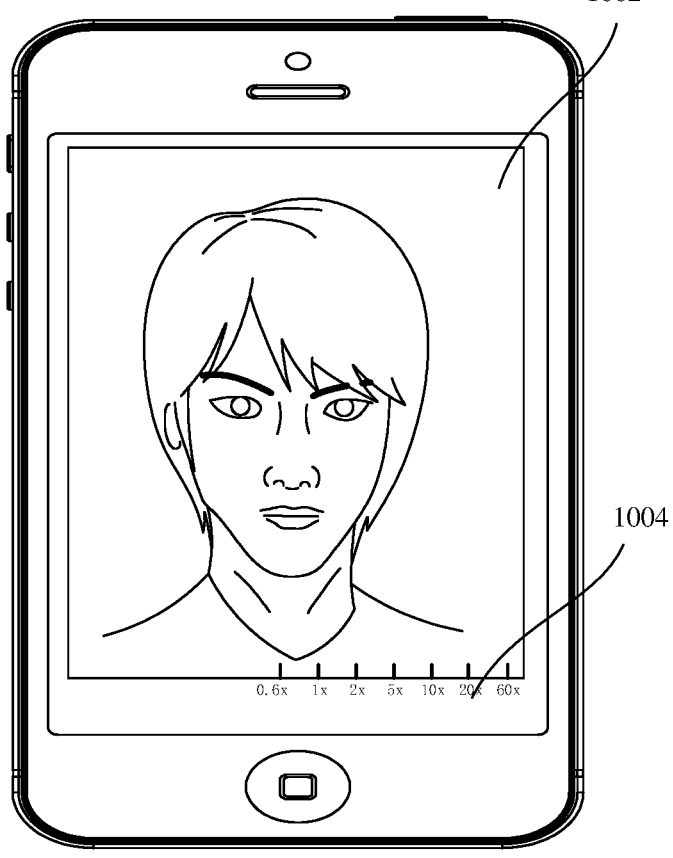
FIG. 10 is a third schematic diagram of an image shot by a shooting apparatus according to an embodiment of this application.

FIG. 10 is a third schematic diagram of an image shot by a shooting apparatus according to an embodiment of this application. As shown in FIG. 10, a user controls a shooting apparatus to start shooting, and controls a target camera to capture an image with a specified zoom ratio and use the image as a target preview image 1002. When the user controls the telescopic screen to expand, the zoom ratio is controlled to increase. When the zoom ratio increases to an appropriate ratio, and the user controls the telescopic screen to stop expanding, the zoom ratio no longer changes. When the user controls the telescopic screen to retract, the zoom ratio is controlled to decrease. When the user controls the telescopic screen to stop retracting, the zoom ratio stops changing. In the process of adjusting the zoom ratio, the target preview image 1002 changes accordingly. A zoom ratio scale 1004 is displayed on a lower side of the target preview image 1002, and the zoom ratio scale 1004 also changes with the zoom ratio and the telescopic state of the telescopic screen.

In this embodiment of this application, the zoom ratio of the target camera for capturing an image is adjusted by controlling the telescopic state of the telescopic screen. Therefore, when adjusting the zoom ratio, the user does not need to invoke an adjustment interface, and an operation step of adjusting the zoom ratio by the user is simplified. In addition, the adjusted zoom ratio can be displayed in the target preview image, so that the user can clearly know the current zoom ratio of the camera.

Figure 11:
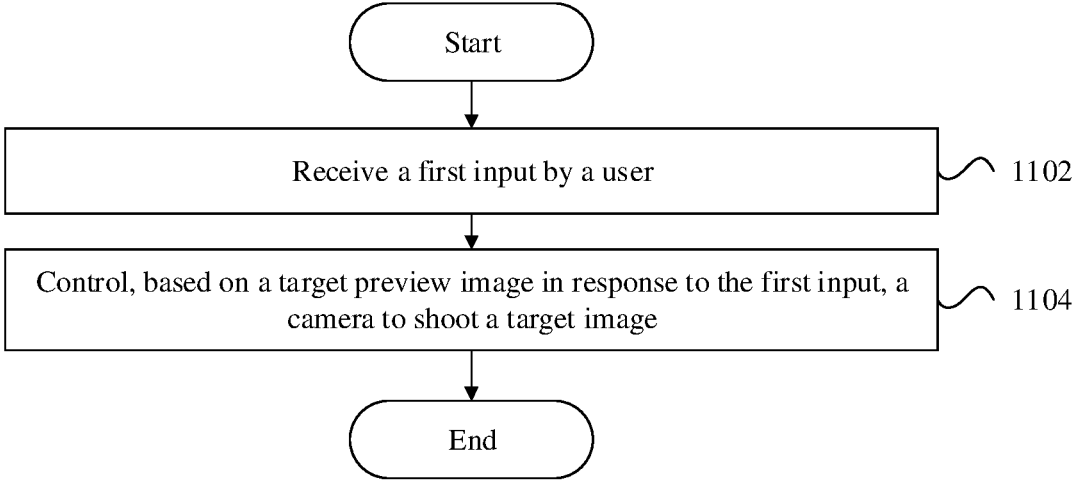
FIG. 11 is a sixth schematic flowchart of a shooting method according to an embodiment of this application.

In some embodiments of this application, FIG. 11 is a sixth schematic flowchart of a shooting method according to an embodiment of this application. As shown in FIG. 11, the shooting method further includes the following steps.

Step 1102: Receive a first input performed by a user.

Step 1104: Control, based on a target preview image in response to the first input, a camera to shoot a target image.

In this embodiment of this application, in a shooting process, a shooting apparatus receives the first input performed by a user, and controls, based on the currently displayed target preview image, the camera to shoot the target image, and stores the target image in a local storage area.

In some embodiments, in response to the first input by the user, the displayed target preview image is directly stored as the target image, so that the target image is completely consistent with the preview image seen by the user in the shooting process.

In some other embodiments, in response to the first input by the user, a raw image corresponding to the target preview image and captured by the target camera is invoked, the raw image is processed based on the target preview image, and the target image is generated. Because the target image is obtained by processing the raw image, definition of the target image is higher than that of the preview image.

In these embodiments, the raw image is processed according to cropping, stitching, and other steps in the process of generating the target preview image, so that the target image is obtained. Therefore, it is ensured that content and a display effect of the target image are the same as those of the target preview image.

It should be noted that the shooting method provided in this embodiment of this application may be performed by the shooting apparatus, or a control module configured to perform the shooting method in the shooting apparatus. A shooting apparatus provided in an embodiment of this application is described by assuming that the shooting method in this embodiment of this application is performed by the shooting apparatus.

Figure 12:
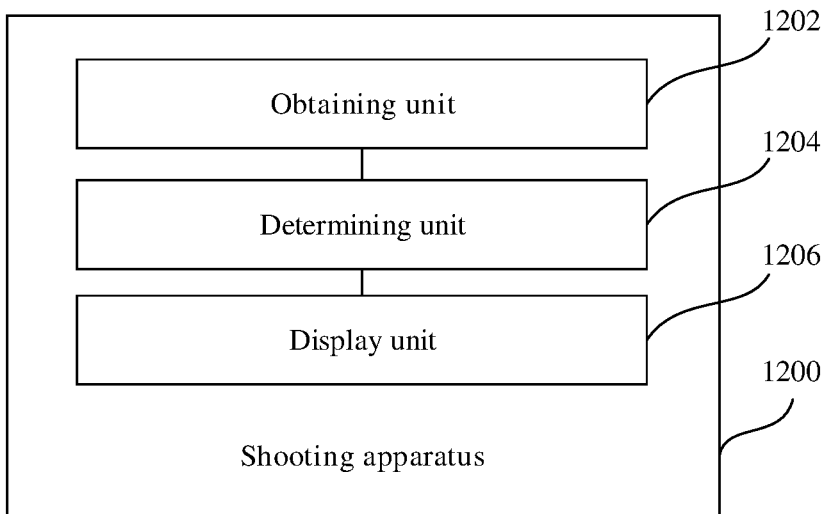
FIG. 12 is a structural block diagram of a shooting apparatus according to an embodiment of this application.

Some embodiments of this application provide a shooting apparatus including a telescopic screen. FIG. 12 is a structural block diagram of a shooting apparatus 1200 according to an embodiment of this application. As shown in FIG. 12, the shooting apparatus includes:

an obtaining unit 1202, configured to obtain telescopic information of a telescopic screen, where the telescopic information includes at least one of a telescopic speed or a telescopic length;

a determining unit 1204, configured to determine, based on the telescopic information, a target camera used for shooting; and a display unit 1206, configured to display a target preview image captured by the target camera.

The shooting apparatus in this embodiment of this application is mainly applied to an electronic device with a telescopic screen, so that when the telescopic screen moves, a preview image being shot changes accordingly, to improve preview experience of a user. In a process of shooting by using the shooting apparatus, the telescopic information of the telescopic screen is obtained, and the telescopic information includes the telescopic speed and the telescopic length. The target camera that needs to be invoked in the shooting process is determined by analyzing the telescopic information of the telescopic screen, the target camera is invoked to capture an image, the target preview image is generated based on the image captured by the target camera, and the target preview image is displayed by using the telescopic screen.

For example, in the shooting process, the user can control a telescopic state of the telescopic screen. In the shooting process, after the shooting apparatus receives an instruction for controlling the telescopic state of the telescopic screen, the shooting apparatus controls the telescopic screen to start performing a corresponding telescopic action and obtains the telescopic information of the telescopic screen. The telescopic information includes at least one of the telescopic length or telescopic speed. Based on at least one of the telescopic length or telescopic speed of the telescopic screen, a target camera is selected from a plurality of cameras of the shooting apparatus, and an image is captured by using the target camera. One target camera may be selected, or a plurality of target cameras may be selected. The telescopic screen is controlled to display a target preview image captured by the target camera. The target preview image may be an image obtained through shooting by a single target camera, or the target image may be an image obtained by processing images shot by a plurality of target cameras.

In some embodiments, when the user shoots a panoramic image by using the shooting apparatus including the telescopic screen, the user does not need to manually move the shooting apparatus. Instead, the user controls expansion or retraction of the telescopic screen, thereby driving the cameras to perform mechanical movement and increasing a panoramic image shooting rate. The target preview image corresponding to the panoramic image is displayed on the telescopic screen. Therefore, it can be ensured that the panoramic image fits the telescopic screen better, and a viewing angle in the panoramic image on the telescopic screen is widened without losing an object size in the panoramic image.

In this embodiment of this application, the shooting apparatus controls expansion or retraction of the telescopic screen in the shooting process to select a target camera from a plurality of cameras, and displays a target preview image based on an image captured by the target camera. Therefore, based on different telescopic information of the telescopic screen, different target cameras can be selected to capture target preview images, and the telescopic screen is controlled to drive the cameras to perform mechanical movement when shooting panoramic images, to ensure a higher panoramic shooting rate. Further, images captured by the plurality of cameras can be composited, and a viewing angle in a preview image can be widened based on a change of the telescopic length of the telescopic screen without losing perception of an object size in the preview image. Therefore, a shooting effect is optimized, and shooting experience is improved.

It may be understood that the change of the telescopic length of the telescopic screen in the shooting process ensures that the obtained target preview image fits a display area of the telescopic screen better. Therefore, the target preview image can be losslessly displayed on the telescopic screen, and an image actually obtained through shooting is consistent with the target preview image.

The telescopic information of the telescopic screen includes the telescopic length. The greater the telescopic length of the telescopic screen, the larger the screen display area of the telescopic screen. The smaller the telescopic length of the telescopic screen, the smaller the screen display area of the telescopic screen. Depending on different display area sizes of the telescopic screen, different cameras located in the shooting apparatus are selected for shooting. Different cameras include cameras in different positions and cameras with different functions, so that a target preview image obtained through shooting fits a size of the display area of the display screen.

It should be noted that the telescopic information of the telescopic screen includes the telescopic speed. When the telescopic speed of the telescopic screen is zero, the telescopic screen is in a stationary state. When the telescopic screen is in the stationary state, a target image is captured by the target camera and displayed. When the telescopic speed of the telescopic screen is greater than zero, that is, when the telescopic screen is in the telescopic state, shooting parameters of the invoked camera may change. To ensure an imaging effect, when a telescopic speed is high, a camera with a higher motion capture capability may be selected for shooting.

In some embodiments of this application, the obtaining unit 1202 is further configured to obtain a real-time telescopic length of the telescopic screen during expansion or retraction of the telescopic screen in a case that the telescopic information indicates that the telescopic screen is in an expansion process or a retraction process.

The telescopic information includes at least one of the telescopic speed or the telescopic length.

For example, after the telescopic information of the telescopic screen is obtained and it is determined that the telescopic speed in the telescopic information is greater than 0, it is determined that the telescopic screen is in a moving state, that is, it is determined that the telescopic screen is in the expansion process or that the telescopic screen is in the retraction process. A moving state of the telescopic screen is determined based on the telescopic length in the telescopic information, and a changing status of the telescopic length of the telescopic screen captured at two consecutive times is determined. When it is determined that the telescopic length is increasing, it is determined that the telescopic screen is in the expansion process. When it is determined that the telescopic length is decreasing, it is determined that the telescopic screen is in the retraction process.

The determining unit 1204 is further configured to determine a camera corresponding to the real-time telescopic length as the target camera.

In this embodiment of this application, a current status of the telescopic screen can be determined based on the telescopic information. When it is determined that the telescopic screen is in a moving process, that is, when the telescopic screen is in the expansion process or the telescopic screen is in the retraction process, the real-time telescopic length of the telescopic screen is detected. A target camera is determined among a plurality of cameras based on the real-time telescopic length of the telescopic screen.

In some embodiments, the electronic device includes a plurality of cameras, and the plurality of cameras are all disposed on the telescopic screen. When the telescopic screen is in a fully retracted state, there is a camera in an exposed state. The electronic device invokes, in response to a start shooting instruction, the camera in the exposed state to capture a target preview image. A memory of the electronic device stores a correspondence between other cameras and the length of the telescopic screen, and the target camera in the correspondence is found based on the real-time telescopic length of the telescopic screen.

In some other embodiments, the electronic device includes a plurality of cameras, and the plurality of cameras are all disposed on the telescopic screen. When the telescopic screen is in a fully retracted state, there is a camera in an exposed state. A photosensitive element is disposed in each of the plurality of cameras. When the telescopic screen is in the expansion or retraction process, the target camera is selected from the plurality of cameras based on changes of luminous flux detected by the photosensitive elements in the cameras. For example, if it is detected that a change of luminous flux of a camera exceeds a change threshold, the camera is selected as the target camera.

For example, a shooting apparatus with a telescopic screen is usually provided with a plurality of cameras. When the telescopic screen of the shooting apparatus is in a retracted state, some of the plurality of cameras are in a stored state. As the telescopic screen is expanded, the cameras in the stored state move with the telescopic screen, until the cameras are in the exposed state. A quantity of cameras in the exposed state is adjusted by controlling the movement of the telescopic screen, and the target camera is determined based on the real-time telescopic length of the telescopic screen.

A driving component for driving the telescopic screen to move is disposed in the shooting device. The real-time telescopic length may be obtained based on a driving parameter of the driving component.

For example, the telescopic screen is selected as a scroll screen, and the driving component is selected as a driving motor. The real-time telescopic length of the telescopic screen can be obtained based on a rotation speed and running duration of the driving motor.

In some embodiments of this application, the obtaining unit 1202 is further configured to obtain at least one preview sub-image captured by the target camera in a case that the telescopic information indicates that the telescopic screen is in the stationary state; and the shooting apparatus further includes:

a first generation unit, configured to perform image stitching on the at least one preview sub-image to generate the target preview image.

In this embodiment of this application, in the shooting process, after determining the target camera and before displaying the preview image captured by the target camera, the shooting apparatus performs analysis processing on the obtained telescopic information, determines, based on the telescopic information, that the telescopic screen is in the stationary state, and obtains the preview sub-image captured by the target camera, where there may be one or more preview sub-images, and there may be one or more target cameras. It may be understood that when there are a plurality of preview sub-images, the plurality of preview sub-images are images captured by a plurality of target cameras respectively, or the plurality of preview sub-images are a plurality of images captured by one target camera. After obtaining the preview sub-images, the shooting apparatus stitches the preview sub-images to generate the target preview image, so that the shooting apparatus can subsequently display the target preview image.

When the telescopic screen is in the stationary state and there are a plurality of target cameras, a plurality of preview sub-images are captured by using the plurality of target cameras. Because at least one of locations or framing ranges of the plurality of target cameras is different, objects in the plurality of preview sub-images captured by the plurality of target cameras are also different. Therefore, the target preview image obtained by stitching the plurality of preview sub-images can cover more objects. This improves an imaging effect of the target preview image and improves user experience.

In some embodiments of this application, the obtaining unit 1202 is further configured to obtain at least one first preview sub-image captured by at least one first camera and at least one second preview sub-image captured by at least one second camera during expansion of the telescopic screen in a case that the telescopic information indicates that the telescopic screen is in the expansion process; and the shooting apparatus further includes:

a second generation unit, configured to perform image stitching on the at least one first preview sub-image and the at least one second preview sub-image to generate the target preview image.

In this embodiment of this application, the shooting apparatus includes a plurality of cameras, and the plurality of cameras include a first camera and a second camera. The first camera is in a stationary state, and the second camera is in a moving state. It may be understood that the first camera and the second camera are both disposed on the telescopic screen. During expansion of the telescopic screen, the screen is expanded in one direction. The first camera does not move as the screen is expanded, but the second camera moves as the screen is expanded. If it is determined, based on the telescopic information, that the telescopic screen is in the expansion process, the first camera in the stationary state shoots an image, and the second camera shoots an image during movement. Because the second camera is in the moving state in the shooting process, a target preview image is obtained by stitching a first preview sub-image captured by the first camera and a second preview sub-image captured by the second camera. The target preview image is a panoramic image.

It may be understood that there may be one or more first cameras in the stationary state. When there are a plurality of first cameras, at least one of locations or framing ranges of the plurality of first cameras is different. There may be one or more second cameras in the moving state. When there are a plurality of second cameras, at least one of locations or framing ranges of the plurality of second cameras is different.

For example, when the user needs to perform shooting by using the shooting apparatus, the user controls the telescopic screen of the shooting apparatus to start expansion. The first camera in the shooting apparatus does not move with expansion of the telescopic screen. During expansion of the telescopic screen, the first camera in the stationary state captures the first preview sub-image, the second camera in the shooting apparatus moves as the telescopic screen is expanded, and the second camera continues to capture the second preview sub-image during the movement. The shooting apparatus stitches the second preview sub-image and the first preview sub-image to obtain the panoramic image, and displays the panoramic image as the target preview image. The telescopic screen is driven by the driving component in the entire expansion process. Therefore, stability of the second camera moving with the telescopic screen is ensured.

In this embodiment of this application, in the process of shooting the panoramic image, the second camera moving with the telescopic screen is controlled to capture the second preview sub-image, and expansion of the telescopic screen is an alternative to manually moving the shooting apparatus by the user. Because the telescopic screen is driven by the driving component in the entire expansion process, uniform and stable movement of the second camera can be maintained in the process of capturing the second preview sub-image. This avoids a problem that a poor imaging effect is caused by a shake when the user performs shooting manually.

In some embodiments of this application, the obtaining unit 1202 is further configured to obtain at least one third preview sub-image captured by at least one third camera and at least one fourth preview sub-image captured by at least one fourth camera during retraction of the telescopic screen in a case that the telescopic information indicates that the telescopic screen is in the retraction process; and the shooting apparatus further includes:

a third generation unit, configured to crop the at least one third preview sub-image based on the at least one fourth preview sub-image to generate the target preview image.

In this embodiment of this application, the shooting apparatus includes a plurality of cameras, and the plurality of cameras include a third camera and a fourth camera. The third camera is in a stationary state, and the fourth camera is in a moving state. It may be understood that the third camera and the fourth camera are both disposed on the telescopic screen. During expansion of the telescopic screen, the screen is expanded in one direction. The third camera does not move as the screen is expanded, but the fourth camera moves as the screen is expanded. If it is determined, based on the telescopic information, that the telescopic screen is in the expansion process, the third camera in the stationary state shoots an image, and the fourth camera shoots an image during movement. A corresponding target preview image can be generated by cropping a third preview sub-image based on a fourth preview sub-image shot during the movement of the fourth camera.

For example, at the beginning of shooting by the shooting apparatus, the third preview sub-image captured by the third camera in the stationary state is displayed as a target preview image. In the shooting process, the fourth camera in the moving state continues to capture the fourth preview sub-image, and the third preview sub-image is cropped based on the fourth preview sub-image captured in real time. The shooting apparatus displays the target preview image obtained through cropping processing.

In some embodiments of this application, the determining unit 1204 is further configured to select one camera from at least two cameras as the target camera in a case that the telescopic information indicates that the telescopic screen is in an expansion process or a retraction process.

In this embodiment of this application, the shooting apparatus includes at least two cameras, and the at least two cameras are different cameras. In the shooting process of the shooting apparatus, one of the at least two cameras is selected as the target camera based on the telescopic state of the telescopic screen.

The at least two cameras are completely different cameras. Optionally, the at least two cameras are disposed in different positions. For example, when the telescopic screen is in the fully retracted state, the at least two cameras include a camera in an exposed state and a camera in a stored state. Further optionally, framing ranges of the at least two cameras are different. Further optionally, zoom ratios of the at least two cameras are different.

In this embodiment of this application, based on the telescopic state of the telescopic screen of the shooting apparatus, a corresponding camera is automatically selected from the plurality of cameras for shooting. The user can switch between cameras by controlling the telescopic state of the telescopic screen, thereby reducing operation steps of the user in the shooting process.

In some embodiments of this application, the determining unit 1204 is further configured to switch from a first camera in a working state to a second camera in a case that the telescopic information indicates that the telescopic screen is in the expansion process; or the determining unit 1204 is further configured to switch from a first camera in a working state to a third camera in a case that the telescopic information indicates that the telescopic screen is in the retraction process, where a zoom ratio of the first camera is less than a zoom ratio of the second camera, and the zoom ratio of the first camera is greater than a zoom ratio of the third camera.

In this embodiment of this application, the shooting device includes the first camera, the second camera, and the third camera, where the second camera has a large zoom ratio. If it is determined, based on the telescopic information, that the telescopic screen is in the expansion process, the second camera with a large zoom ratio is turned on, the first camera is turned off, and an image captured by the second camera is used as a target preview image. If it is determined, based on the telescopic information, that the telescopic screen is in the retraction process, the third camera with a small zoom ratio is turned on, the first camera is turned off, and an image captured by the third camera is used as a target preview image.

In some embodiments of this application, the shooting apparatus further includes:

a receiving unit, configured to receive a first input by a user; and a control unit, configured to control, based on the target preview image in response to the first input, a camera to shoot a target image.

In this embodiment of this application, in the shooting process, the shooting apparatus receives the first input by the user, and controls, based on the currently displayed target preview image, the camera to shoot the target image, and stores the target image in a local storage area.

The shooting apparatus in this embodiment of this application may be a terminal, or may be a component, an integrated circuit, or a chip in a terminal. The apparatus may be a mobile electronic device, or may be a non-mobile electronic device. For example, the mobile electronic device may be a mobile phone, a tablet computer, a notebook computer, a palmtop computer, an in-vehicle electronic device, a wearable device, an ultra-mobile personal computer (UMPC), a netbook, a personal digital assistant (PDA), or the like. The non-mobile electronic device may be a server, a network attached storage (NAS), a personal computer (PC), a television (TV), a teller machine, a self-service machine, or the like. This is not limited in this embodiment of this application.

The shooting apparatus in this embodiment of this application may be an apparatus having an operating system. The operating system may be an Android operating system, an iOS operating system, or other possible operating systems, and is not limited in this embodiment of this application.

The shooting apparatus provided in this embodiment of this application is capable of implementing each process implemented in the method embodiments in FIG. 1 to FIG. 11. To avoid repetition, details are not described herein again.

Figures 13, 14:
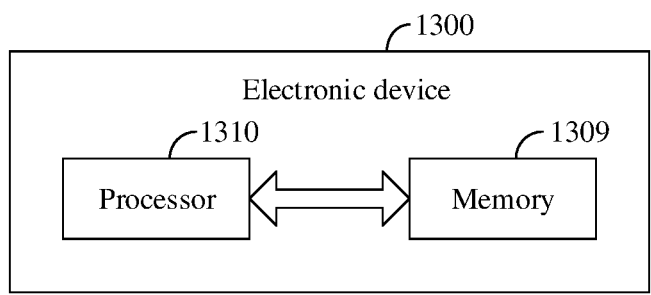
FIG. 13 is a structural block diagram of an electronic device according to an embodiment of this application.
FIG. 14 is a schematic diagram of a hardware structure of an electronic device for implementing embodiments of this application.

Optionally, an embodiment of this application further provides an electronic device. FIG. 13 is a structural block diagram of an electronic device 1300 according to an embodiment of this application. As shown in FIG. 13, the electronic device includes a processor 1310, a memory 1309, and a program or instructions stored in the memory 1309 and executable on the processor 1310. When the program or instructions are executed by the processor 1310, each process of the foregoing shooting method embodiment is implemented, with the same technical effect achieved. To avoid repetition, details are not described herein again.

It should be noted that the electronic device 1300 in this embodiment of this application includes the foregoing mobile electronic device and a non-mobile electronic device.

The shooting apparatus in this embodiment of this application may be an apparatus, or may be a component, an integrated circuit, or a chip in a terminal. The apparatus may be a mobile electronic device, or may be a non-mobile electronic device. For example, the mobile electronic device may be a mobile phone, a tablet computer, a notebook computer, a palmtop computer, an in-vehicle electronic device, a wearable device, an ultra-mobile personal computer (UMPC), a netbook, a personal digital assistant (PDA), or the like. The non-mobile electronic device may be a server, a network attached storage (NAS), a personal computer (PC), a television (TV), a teller machine, a self-service machine, or the like. This is not limited in this embodiment of this application.

The shooting apparatus in this embodiment of this application may be an apparatus having an operating system. The operating system may be an Android operating system, an iOS operating system, or other possible operating systems, and is not limited in this embodiment of this application.

FIG. 14 is a schematic diagram of a hardware structure of an electronic device for implementing the embodiments of this application.

The electronic device 1400 includes but is not limited to components such as a radio frequency unit 1401, a network module 1402, an audio output unit 1403, an input unit 1404, a sensor 1405, a display unit 1406, a user input unit 1407, an interface unit 1408, a memory 1409, and a processor 1410.

A person skilled in the art may understand that the electronic device 1400 may further include a power supply (such as a battery) for supplying power to the components. The power supply may be logically connected to the processor 1410 through a power management system. In this way, functions such as charge management, discharge management, and power consumption management are implemented by using the power management system. The structure of the electronic device shown in FIG. 14 does not constitute a limitation on the electronic device. The electronic device may include more or fewer components than those shown in the figure, or some components are combined, or component arrangements are different. Details are not described herein again.

The processor 1410 is configured to obtain telescopic information of a telescopic screen.

The processor 1410 is configured to determine, based on the telescopic information, a target camera used for shooting.

The display unit 1406 is configured to display a target preview image captured by the target camera.

In this embodiment of this application, the telescopic screen is controlled to expand or retract in a shooting process of the shooting apparatus to select a target camera from a plurality of cameras, and display a target preview image based on an image captured by the target camera. Therefore, based on different telescopic information of the telescopic screen, different target cameras can be selected to capture target preview images, so that the obtained target preview image fits a display area of the telescopic screen better. Therefore, the target preview image can be losslessly displayed on the telescopic screen, an image actually obtained through shooting is consistent with the target preview image, and user experience is improved.

Optionally, the processor 1410 is configured to obtain a real-time telescopic length of the telescopic screen during expansion or retraction of the telescopic screen in a case that the telescopic information indicates that the telescopic screen is in an expansion process or a retraction process; and the processor 1410 is configured to determine a camera corresponding to the real-time telescopic length as the target camera.

In this embodiment of this application, a current status of the telescopic screen can be determined based on the telescopic information. When it is determined that the telescopic screen is in a moving process, that is, when the telescopic screen is in the expansion process or the telescopic screen is in the retraction process, the real-time telescopic length of the telescopic screen is detected. A target camera is determined among a plurality of cameras based on the real-time telescopic length of the telescopic screen.

For example, a shooting apparatus with a telescopic screen is usually provided with a plurality of cameras. When the telescopic screen of the shooting apparatus is in a retracted state, some of the plurality of cameras are in a stored state. As the telescopic screen is expanded, the cameras in the stored state move with the telescopic screen, until the cameras are in the exposed state. A quantity of cameras in the exposed state is adjusted by controlling the movement of the telescopic screen, and the target camera is determined based on the real-time telescopic length of the telescopic screen.

Optionally, the processor 1410 is configured to obtain at least one preview sub-image captured by the target camera in a case that the telescopic information indicates that the telescopic screen is in a stationary state; and the processor 1410 is configured to perform image stitching on the at least one preview sub-image to generate the target preview image.

In this embodiment of this application, in the shooting process, after determining the target camera and before displaying the preview image captured by the target camera, the shooting apparatus performs analysis processing on the obtained telescopic information, determines, based on the telescopic information, that the telescopic screen is in the stationary state, and obtains the preview sub-image captured by the target camera, where there may be one or more preview sub-images, and there may be one or more target cameras. It may be understood that when there are a plurality of preview sub-images, the plurality of preview sub-images are images captured by a plurality of target cameras respectively, or the plurality of preview sub-images are a plurality of images captured by one target camera. After obtaining the preview sub-images, the shooting apparatus stitches the preview sub-images to generate the target preview image, so that the shooting apparatus can subsequently display the target preview image.

When the telescopic screen is in the stationary state and there are a plurality of target cameras, a plurality of preview sub-images are captured by using the plurality of target cameras. Because at least one of locations or framing ranges of the plurality of target cameras is different, objects in the plurality of preview sub-images captured by the plurality of target cameras are also different. Therefore, the target preview image obtained by stitching the plurality of preview sub-images can cover more objects. This improves an imaging effect of the target preview image and improves user experience.

Optionally, the processor 1410 is configured to obtain at least one first preview sub-image captured by at least one first camera and at least one second preview sub-image captured by at least one second camera during expansion of the telescopic screen in a case that the telescopic information indicates that the telescopic screen is in the expansion process; and the processor 1410 is configured to perform image stitching on the at least one first preview sub-image and the at least one second preview sub-image to generate the target preview image.

In this embodiment of this application, the shooting apparatus includes a plurality of cameras, and the plurality of cameras include a first camera and a second camera. The first camera is in a stationary state, and the second camera is in a moving state. It may be understood that the first camera and the second camera are both disposed on the telescopic screen. During expansion of the telescopic screen, the screen is expanded in one direction. The first camera does not move as the screen is expanded, but the second camera moves as the screen is expanded. If it is determined, based on the telescopic information, that the telescopic screen is in the expansion process, the first camera in the stationary state shoots an image, and the second camera shoots an image during movement. Because the second camera is in the moving state in the shooting process, a target preview image is obtained by stitching a first preview sub-image captured by the first camera and a second preview sub-image captured by the second camera. The target preview image is a panoramic image.

When a user needs to perform shooting by using the shooting apparatus, the user controls the telescopic screen of the shooting apparatus to start expansion. The first camera in the shooting apparatus does not move with expansion of the telescopic screen. During expansion of the telescopic screen, the first camera in the stationary state captures the first preview sub-image, the second camera in the shooting apparatus moves as the telescopic screen is expanded, and the second camera continues to capture the second preview sub-image during the movement. The shooting apparatus stitches the second preview sub-image and the first preview sub-image to obtain the panoramic image, and displays the panoramic image as the target preview image. The telescopic screen is driven by a driving component in the entire expansion process. Therefore, stability of the second camera moving with the telescopic screen is ensured.

In this embodiment of this application, in the process of shooting the panoramic image, the second camera moving with the telescopic screen is controlled to capture the second preview sub-image, and expansion of the telescopic screen is an alternative to manually moving the shooting apparatus by the user. Because the telescopic screen is driven by the driving component in the entire expansion process, uniform and stable movement of the second camera can be maintained in the process of capturing the second preview sub-image. This avoids a problem that a poor imaging effect is caused by a shake when the user performs shooting manually.

Optionally, the processor 1410 is configured to obtain at least one third preview sub-image captured by at least one third camera and at least one fourth preview sub-image captured by at least one fourth camera during retraction of the telescopic screen in a case that the telescopic information indicates that the telescopic screen is in the retraction process; and the processor 1410 is configured to crop the at least one third preview sub-image based on the at least one fourth preview sub-image to generate the target preview image.

In this embodiment of this application, the shooting apparatus includes a plurality of cameras, and the plurality of cameras include a third camera and a fourth camera. The third camera is in a stationary state, and the fourth camera is in a moving state. It may be understood that the third camera and the fourth camera are both disposed on the telescopic screen. During expansion of the telescopic screen, the screen is expanded in one direction. The third camera does not move as the screen is expanded, but the fourth camera moves as the screen is expanded. If it is determined, based on the telescopic information, that the telescopic screen is in the expansion process, the third camera in the stationary state shoots an image, and the fourth camera shoots an image during movement. A corresponding target preview image can be generated by cropping a third preview sub-image based on a fourth preview sub-image shot during the movement of the fourth camera.

At the beginning of shooting by the shooting apparatus, the third preview sub-image captured by the third camera in the stationary state is displayed as a target preview image. In the shooting process, the fourth camera in the moving state continues to capture the fourth preview sub-image, and the third preview sub-image is cropped based on the fourth preview sub-image captured in real time. The shooting apparatus displays the target preview image obtained through cropping processing.

Optionally, the processor 1410 is configured to select one camera from at least two cameras as the target camera in a case that the telescopic information indicates that the telescopic screen is in the expansion process or retraction process.

In this embodiment of this application, the shooting apparatus includes at least two cameras, and the at least two cameras are different cameras. In the shooting process of the shooting apparatus, one of the at least two cameras is selected as the target camera based on a telescopic state of the telescopic screen.

The at least two cameras are completely different cameras. Optionally, the at least two cameras are disposed in different positions. For example, when the telescopic screen is in a fully retracted state, the at least two cameras include a camera in an exposed state and a camera in a stored state. Further optionally, framing ranges of the at least two cameras are different. Further optionally, zoom ratios of the at least two cameras are different.

In this embodiment of this application, based on the telescopic state of the telescopic screen of the shooting apparatus, a corresponding camera is automatically selected from the plurality of cameras for shooting. The user can switch between cameras by controlling the telescopic state of the telescopic screen, thereby reducing operation steps of the user in the shooting process.

Optionally, the processor 1410 is configured to switch from a first camera in a working state to a second camera in a case that the telescopic information indicates that the telescopic screen is in the expansion process; or the processor 1410 is configured to switch from a first camera in a working state to a third camera in a case that the telescopic information indicates that the telescopic screen is in the retraction process, where a zoom ratio of the first camera is less than a zoom ratio of the second camera, and the zoom ratio of the first camera is greater than a zoom ratio of the third camera.

In this embodiment of this application, the shooting device includes the first camera, the second camera, and the third camera, where the second camera has a large zoom ratio. If it is determined, based on the telescopic information, that the telescopic screen is in the expansion process, the second camera with a large zoom ratio is turned on, the first camera is turned off, and an image captured by the second camera is used as a target preview image. If it is determined, based on the telescopic information, that the telescopic screen is in the retraction process, the third camera with a small zoom ratio is turned on, the first camera is turned off, and an image captured by the third camera is used as a target preview image.

Optionally, the user input unit 1407 is configured to receive a first input by a user; and the processor 1410 is configured to control, based on the target preview image in response to the first input, a camera to shoot a target image.

In this embodiment of this application, in the shooting process, the shooting apparatus receives the first input by the user, and controls, based on the currently displayed target preview image, the camera to shoot the target image, and stores the target image in a local storage area.

It should be understood that, in this embodiment of this application, as shown in FIG. 14, the input unit 1404 may include a graphics processing unit (GPU) 14041 and a microphone 14042. The graphics processing unit 14041 processes image data of a still picture or video obtained by an image capture apparatus (such as a camera) in a video capture mode or an image capture mode. The display unit 1406 may include a display panel 14061, and the display panel 14061 may be configured in a form of a liquid crystal display, an organic light-emitting diode, or the like. The user input unit 1407 includes a touch panel 14071 and other input devices 14072. The touch panel 14071 is also referred to as a touchscreen. The touch panel 14071 may include two parts: a touch detection apparatus and a touch control unit. The other input devices 14072 may include but are not limited to a physical keyboard, a function key (such as a volume control button or a power button), a trackball, a mouse, and a joystick. Details are not described herein again. The memory 1409 may be configured to store a software program and various data, including but not limited to an application program and an operating system. The processor 1410 may integrate an application processor and a modem processor. The application processor mainly processes the operating system, a user interface, an application program, or the like. The modem processor mainly processes wireless communication. It may be understood that the modem processor may alternatively not be integrated in the processor 1410.

An embodiment of this application further provides a non-transitory readable storage medium. The non-transitory readable storage medium stores a program or instructions. When the program or instructions are executed by a processor, each process of the foregoing shooting method embodiment is implemented, with the same technical effect achieved. To avoid repetition, details are not described herein again.

The processor is a processor in the electronic device in the foregoing embodiment. The non-transitory readable storage medium includes a non-transitory computer-readable storage medium, for example, a computer read-only memory (ROM), a random access memory (RAM), a magnetic disk, or an optical disc.

In addition, an embodiment of this application provides a chip. The chip includes a processor and a communications interface. The communications interface is coupled to the processor. The processor is configured to run a program or instructions to implement each process of the foregoing shooting method embodiment, with the same technical effect achieved. To avoid repetition, details are not described herein again.

It should be understood that the chip provided in this embodiment of this application may also be referred to as a system-level chip, a system chip, a chip system, a system-on-chip, or the like.

It should be noted that in this specification, the term "comprise", "include", or any of their variants are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element. In addition, it should be noted that the scope of the method and apparatus in the implementations of this application is not limited to performing the functions in an order shown or discussed, and may further include performing the functions in a substantially simultaneous manner or in a reverse order depending on the functions used. For example, the method described may be performed in an order different from that described, and various steps may be added, omitted, or combined. In addition, features described with reference to some examples may be combined in other examples.

According to the foregoing description of the implementations, a person skilled in the art may clearly understand that the methods in the foregoing embodiments may be implemented by using software in combination with a necessary general hardware platform, and certainly may alternatively be implemented by using hardware. Based on such an understanding, the technical solutions of this application essentially or the part contributing to the prior art may be implemented in a form of a computer software product. The computer software product is stored in a storage medium (such as a ROM/RAM, a magnetic disk, or an optical disc), and includes several instructions for instructing a terminal (which may be a mobile phone, a computer, a server, a network device, or the like) to perform the methods described in the embodiments of this application.

The foregoing describes the embodiments of this application with reference to the accompanying drawings. However, this application is not limited to the foregoing embodiments. The foregoing embodiments are merely illustrative rather than restrictive. Inspired by this application, a person of ordinary skill in the art may develop many other manners without departing from principles of this application and the protection scope of the claims, and all such manners fall within the protection scope of this application.

What is claimed is:

1. A shooting method, applied to a shooting apparatus comprising a telescopic screen, wherein the shooting method comprises:

obtaining telescopic information of the telescopic screen;

determining, based on the telescopic information, a target camera used for shooting; and displaying a target preview image captured by the target camera;

wherein when the telescopic screen is a scroll screen, the telescopic information comprises telescopic speed, and the target camera comprises at least one second camera in a moving state, the at least one second camera continuously collects a second preview sub-image during movement, and the shooting method further comprises:

before starting shooting, controlling an expansion speed of the scroll screen in a shooting process according to brightness of a shooting environment, so that a moving speed of the at least one second camera meets an exposure requirement of the second preview sub-image.

2. The shooting method according to claim 1, wherein the telescopic information comprises at least one of the telescopic speed or a telescopic length; and the determining, based on the telescopic information, a target camera used for shooting comprises:

in a case that the telescopic information indicates that the telescopic screen is in an expansion process or a retraction process, obtaining a real-time telescopic length of the telescopic screen during expansion or retraction of the telescopic screen; and determining a camera corresponding to the real-time telescopic length as the target camera.

3. The shooting method according to claim 1, wherein before the displaying a target preview image captured by the target camera, the method further comprises:

in a case that the telescopic information indicates that the telescopic screen is in a stationary state, obtaining at least one preview sub-image captured by the target camera; and performing image stitching on the at least one preview sub-image to generate the target preview image.

4. The shooting method according to claim 1, wherein the target camera comprises at least one first camera in a stationary state and the at least one second camera in the moving state; and before the displaying a target preview image captured by the target camera, the method further comprises:

in a case that the telescopic information indicates that the telescopic screen is in an expansion process, obtaining at least one first preview sub-image captured by the at least one first camera and at least one second preview sub-image captured by the at least one second camera during expansion of the telescopic screen; and performing image stitching on the at least one first preview sub-image and the at least one second preview sub-image to generate the target preview image.

5. The shooting method according to claim 1, wherein the target camera comprises at least one third camera in a stationary state and at least one fourth camera in a moving state; and before the displaying a target preview image captured by the target camera, the method further comprises:

in a case that the telescopic information indicates that the telescopic screen is in an retraction process, obtaining at least one third preview sub-image captured by the at least one third camera and at least one fourth preview sub-image captured by the at least one fourth camera during retraction of the telescopic screen; and cropping the at least one third preview sub-image based on the at least one fourth preview sub-image to generate the target preview image.

6. The shooting method according to claim 1, wherein the determining, based on the telescopic information, a target camera used for shooting comprises:

in a case that the telescopic information indicates that the telescopic screen is in an expansion process or a retraction process, selecting one camera from at least two cameras as the target camera.

7. The shooting method according to claim 6, wherein the selecting one camera from at least two cameras as the target camera in a case that the telescopic information indicates that the telescopic screen is in an expansion process or a retraction process comprises:

in a case that the telescopic information indicates that the telescopic screen is in the expansion process, switching from a first camera in a working state to a second camera; or in a case that the telescopic information indicates that the telescopic screen is in the retraction process, switching from a first camera in a working state to a third camera, wherein a zoom ratio of the first camera is less than a zoom ratio of the second camera, and the zoom ratio of the first camera is greater than a zoom ratio of the third camera.

8. The shooting method according to claim 1, further comprising:

receiving a first input by a user; and controlling, based on the target preview image in response to the first input, a camera to shoot a target image.

9. An electronic device comprising a telescopic screen, comprising a processor and a memory storing a program or an instruction that is capable of running on the processor, wherein the program or the instruction, when executed by the processor, causes the electronic device to perform:

obtaining telescopic information of the telescopic screen;

determining, based on the telescopic information, a target camera used for shooting; and displaying a target preview image captured by the target camera;

wherein when the telescopic screen is a scroll screen, the telescopic information comprises telescopic speed, and the target camera comprises at least one second camera in a moving state, the at least one second camera continuously collects a second preview sub-image during movement, and the program or the instruction, when executed by the processor, further causes the electronic device to perform:

before starting shooting, controlling an expansion speed of the scroll screen in a shooting process according to brightness of a shooting environment, so that a moving speed of the at least one second camera meets an exposure requirement of the second preview sub-image.

10. The electronic device according to claim 9, wherein the telescopic information comprises at least one of the telescopic speed or a telescopic length; and when determining, based on the telescopic information, the target camera used for shooting, the program or the instruction, when executed by the processor, causes the electronic device to perform:

in a case that the telescopic information indicates that the telescopic screen is in an expansion process or a retraction process, obtaining a real-time telescopic length of the telescopic screen during expansion or retraction of the telescopic screen; and determining a camera corresponding to the real-time telescopic length as the target camera.

11. The electronic device according to claim 9, wherein before displaying the target preview image captured by the target camera, the program or the instruction, when executed by the processor, causes the electronic device to further perform:

in a case that the telescopic information indicates that the telescopic screen is in a stationary state, obtaining at least one preview sub-image captured by the target camera; and performing image stitching on the at least one preview sub-image to generate the target preview image.

12. The electronic device according to claim 9, wherein the target camera comprises at least one first camera in a stationary state and the at least one second camera in the moving state; and before displaying the target preview image captured by the target camera, the program or the instruction, when executed by the processor, causes the electronic device to further perform:

in a case that the telescopic information indicates that the telescopic screen is in an expansion process, obtaining at least one first preview sub-image captured by the at least one first camera and at least one second preview sub-image captured by the at least one second camera during expansion of the telescopic screen; and performing image stitching on the at least one first preview sub-image and the at least one second preview sub-image to generate the target preview image.

13. The electronic device according to claim 9, wherein the target camera comprises at least one third camera in a stationary state and at least one fourth camera in a moving state; and before displaying the target preview image captured by the target camera, the program or the instruction, when executed by the processor, causes the electronic device to further perform:

in a case that the telescopic information indicates that the telescopic screen is in an retraction process, obtaining at least one third preview sub-image captured by the at least one third camera and at least one fourth preview sub-image captured by the at least one fourth camera during retraction of the telescopic screen; and cropping the at least one third preview sub-image based on the at least one fourth preview sub-image to generate the target preview image.

14. The electronic device according to claim 9, wherein when determining, based on the telescopic information, the target camera used for shooting, the program or the instruction, when executed by the processor, causes the electronic device to perform:

in a case that the telescopic information indicates that the telescopic screen is in an expansion process or a retraction process, selecting one camera from at least two cameras as the target camera.

15. The electronic device according to claim 14, wherein when selecting one camera from at least two cameras as the target camera in the case that the telescopic information indicates that the telescopic screen is in an expansion process or a retraction process, the program or the instruction, when executed by the processor, causes the electronic device to perform:

in a case that the telescopic information indicates that the telescopic screen is in the expansion process, switching from a first camera in a working state to a second camera; or in a case that the telescopic information indicates that the telescopic screen is in the retraction process, switching from a first camera in a working state to a third camera, wherein a zoom ratio of the first camera is less than a zoom ratio of the second camera, and the zoom ratio of the first camera is greater than a zoom ratio of the third camera.

16. The electronic device according to claim 9, wherein the program or the instruction, when executed by the processor, causes the electronic device to further perform:

receiving a first input by a user; and controlling, based on the target preview image in response to the first input, a camera to shoot a target image.

17. A non-transitory readable storage medium storing a program or an instruction, wherein the program or the instruction, when executed by a processor, causes the processor to perform:

obtaining telescopic information of a telescopic screen;

determining, based on the telescopic information, a target camera used for shooting; and displaying a target preview image captured by the target camera;

wherein when the telescopic screen is a scroll screen, the telescopic information comprises telescopic speed, and the target camera comprises at least one second camera in a moving state, the at least one second camera continuously collects a second preview sub-image during movement, and the program or the instruction, when executed by the processor, further causes the processor to perform:

before starting shooting, controlling an expansion speed of the scroll screen in a shooting process according to brightness of a shooting environment, so that a moving speed of the at least one second camera meets an exposure requirement of the second preview sub-image.

18. The non-transitory readable storage medium according to claim 17, wherein the telescopic information comprises at least one of the telescopic speed or a telescopic length; and when determining, based on the telescopic information, the target camera used for shooting, the program or the instruction, when executed by the processor, causes the processor to perform:

in a case that the telescopic information indicates that the telescopic screen is in an expansion process or a retraction process, obtaining a real-time telescopic length of the telescopic screen during expansion or retraction of the telescopic screen; and determining a camera corresponding to the real-time telescopic length as the target camera.

19. The non-transitory readable storage medium according to claim 17, wherein before displaying the target preview image captured by the target camera, the program or the instruction, when executed by the processor, causes the processor to further perform:

in a case that the telescopic information indicates that the telescopic screen is in a stationary state, obtaining at least one preview sub-image captured by the target camera; and performing image stitching on the at least one preview sub-image to generate the target preview image.

20. The non-transitory readable storage medium according to claim 17, wherein the target camera comprises at least one first camera in a stationary state and the at least one second camera in the moving state; and before displaying the target preview image captured by the target camera, the program or the instruction, when executed by the processor, causes the processor to further perform:

in a case that the telescopic information indicates that the telescopic screen is in an expansion process, obtaining at least one first preview sub-image captured by the at least one first camera and at least one second preview sub-image captured by the at least one second camera during expansion of the telescopic screen; and performing image stitching on the at least one first preview sub-image and the at least one second preview sub-image to generate the target preview image.

* * * * *